US012704235B2

(12) United States Patent
Kuchynka

(10) Patent No.: US 12,704,235 B2
(45) Date of Patent: Aug. 11, 2026

(54) LIGHTGUIDE FOR A VEHICLE LAMP, VEHICLE LAMP, MOULD FOR MOULDING THE LIGHTGUIDE AND METHOD OF MANUFACTURING THE MOULD

(71) Applicant: HELLA AUTOTECHNIK NOVA S.R.O., Mohelnice (CZ)

(72) Inventor: Tomas Kuchynka, Olomouc (CZ)

(73) Assignee: HELLA AUTOTECHNIK NOVA S.R.O., Mohelnice (CZ)

( * ) Notice: Subject to any disclaimer, the term of this patent is extended or adjusted under 35 U.S.C. 154(b) by 57 days.

(21) Appl. No.: 18/673,652

(22) Filed: May 24, 2024

(65) Prior Publication Data

US 2024/0392942 A1 Nov. 28, 2024

(30) Foreign Application Priority Data

May 26, 2023 (EP) .................................... 23175629

(51) Int. Cl.
*F21S 43/239* (2018.01)
*F21S 43/247* (2018.01)

(52) U.S. Cl.
CPC ........... *F21S 43/239* (2018.01); *F21S 43/247* (2018.01)

(58) Field of Classification Search
CPC ...... F21S 43/315; F21S 43/236; F21S 43/234; F21S 43/241; F21S 43/247; F21S 43/242; F21S 43/243; F21S 43/245; G02B 6/0035; G02B 6/0036; G02B 6/0038; G02B 6/004; G02B 6/0043; G02B 6/0045; G02B 6/0046; G02B 6/0048
See application file for complete search history.

(56) References Cited

U.S. PATENT DOCUMENTS

2009/0257245 A1* 10/2009 Kim .......................... F21V 7/04 362/626
2012/0163033 A1* 6/2012 Chang .................. G02B 6/0065 362/625

(Continued)

FOREIGN PATENT DOCUMENTS

DE 202004010853 U1 9/2004
DE 102005011715 A1 9/2006

(Continued)

OTHER PUBLICATIONS

European Search Report from the European Patent Office for Application No. EP23175629, dated Sep. 11, 2023 (3 pages).

*Primary Examiner* — Zheng Song
*Assistant Examiner* — James M Endo
(74) *Attorney, Agent, or Firm* — WARNER NORCROSS + JUDD LLP

(57) ABSTRACT

A lightguide for a vehicle lamp having an elongated first part and a second part. The first part comprises a coupling face for coupling light from a light source into the lightguide and the second part includes a reflection surface and an output surface. The reflection surface includes at least a first reflection element and a second reflection element for reflecting light towards the output surface. At least one rounded recess is arranged at least partially on the first reflection element to increase homogeneity of light emitted from the output surface. The invention also relates to a vehicle lamp, a mould for moulding the lightguide and a method of manufacturing the mould.

6 Claims, 5 Drawing Sheets

(56) References Cited

U.S. PATENT DOCUMENTS

| | | | | |
|---|---|---|---|---|
| 2014/0003071 | A1* | 1/2014 | de Lamberterie | F21S 41/141<br>362/487 |
| 2014/0078765 | A1* | 3/2014 | Bungenstock | B60Q 1/0011<br>362/511 |
| 2014/0140084 | A1* | 5/2014 | Zwick | F21S 43/237<br>362/511 |
| 2016/0356446 | A1* | 12/2016 | Okada | F21S 43/241 |
| 2017/0219761 | A1* | 8/2017 | Fukui | F21S 43/245 |
| 2017/0261168 | A1* | 9/2017 | Edletzberger | F21S 43/237 |
| 2020/0200349 | A1* | 6/2020 | Dey | F21S 41/24 |
| 2021/0301994 | A1* | 9/2021 | Juhanak | F21S 43/239 |

FOREIGN PATENT DOCUMENTS

| | | | |
|---|---|---|---|
| DE | 102015106242 | A1 | 10/2016 |
| EP | 0940625 | A2 | 9/1999 |
| EP | 2955554 | A1 | 12/2015 |
| EP | 3760916 | A1 | 1/2021 |
| KR | 100786384 | B1 | 12/2007 |
| KR | 20110027185 | A | 3/2011 |
| WO | 2018222637 | A1 | 12/2018 |

* cited by examiner

LIGHTGUIDE FOR A VEHICLE LAMP, VEHICLE LAMP, MOULD FOR MOULDING THE LIGHTGUIDE AND METHOD OF MANUFACTURING THE MOULD

CROSS-REFERENCE TO RELATED APPLICATIONS

The present application claims the benefit of European Patent Application No. 23175629.7, filed May 26, 2023, the disclosure of which is incorporated by reference.

FIELD OF THE INVENTION

The present invention relates to a lightguide for improving homogeneity of a vehicle lamp, particularly a side marker lamp. The invention also relates to the vehicle lamp, a mould for moulding the lightguide and a method of manufacturing the mould.

BACKGROUND OF THE INVENTION

In the state of the art, when a side marker lamp is viewed from a side viewing angle, black area (called "a dark spot") can be seen near one end of an output surface of the lamp. This inhomogeneity is caused by an arrangement of lamp's lightguide with a standard prism optics, which is used to direct light towards the output surface. Specifically, the lightguide comprises an elongated, approximately cylindrical first part and a second part, wherein the second part comprises a prism optics having a plurality of linear reflection elements and the output surface arranged opposite to the prism optics. Light from a light source is coupled into the first part of the lightguide and then reflected on the prism optics towards the output surface of the lightguide, where the light leaves the lightguide. However, the standard prism optics does not direct the light homogeneously towards the whole area of the output surface. Specifically, it does not direct the light to a proximal section of the output surface, that is to a section proximal to the first part of the lightguide.

This problem can be solved by changing the geometry of the prism optics, primarily by increasing the number of linear reflection elements. However, this adjustment requires a significant modification of a mould for moulding the lightguide. Often the existing moulds cannot be used at all and completely new moulds have to be made, which rapidly increases production costs.

Therefore, it would be desirable to come up with a solution that would provide a lightguide for a vehicle lamp with improved homogeneity, that is without the dark spot at the proximal area of the output surface. The new solution should also be inexpensive to produce and it should not require significant modification of the existing moulds.

SUMMARY OF THE INVENTION

The shortcomings of the solutions known in the prior art are to some extent eliminated by a lightguide for a vehicle lamp, the lightguide comprising an elongated first part and a second part, wherein the first part comprises a coupling face for coupling light from a light source into the lightguide and wherein the second part comprises a reflection surface and an output surface for outputting light from the lightguide. The reflection surface and the output surface are arranged opposite to each other. The reflection surface comprises a plurality of reflection elements for reflecting light towards the output surface, wherein the plurality of reflection elements comprises at least a first reflection element and a second reflection element, wherein the first reflection element is the closest to the first part from the plurality of reflection elements and the second reflection element is the closest to the first reflection element from the plurality of reflection elements. In other words, the first reflection element is arranged adjacent to the first part and the second reflection element is arranged adjacent to the first reflection element. Reflection elements can be e.g., implemented as standard prism optics known from the state of the art, for example as set of step-shaped linear elements. These elements reflect light on the principle of total internal reflection towards the output surface.

The output surface comprises a proximal output section which is proximal to the first part and a distal output section which is distal to the first part. The proximal output section is thus located adjacent to a first end of the output surface and the distal output section is located adjacent to the proximal output section and it extends from the proximal output section to a second end of the output surface, wherein the first end of the output surface is closer to the first part of the lightguide than the second end of the output surface. Preferably, the area of the proximal output section is approximately one fifth of the area of the entire output surface. The area of the distal output section is complementary, which means that the proximal output section and the distal output section together form the entire output surface. Alternatively, depending on the arrangement of the lightguide, the area of the proximal output section can be smaller than one fifth of the entire output surface, for example approximately one sixth, one seventh or smaller. On the other hand, the area of the proximal output section can be larger than one fifth of the entire output surface, for example approximately one fourth, one third or larger. However, the area of the proximal output section is generally smaller than or equal to the area of the distal output section.

The lightguide according to present invention comprises at least one rounded recess for reflecting light towards the proximal output section to increase homogeneity of light emitted from the output surface, wherein the at least one rounded recess is arranged at least partially on the first reflection element. The at least one rounded recess thus reflects light to the proximal output section and no dark spot is created in the proximal output section, or the dark spot is at least reduced. Light output through the output surface is more homogeneous than with the standard prism optics according to the prior art without the at least one rounded recess. In addition, no significant modification of the existing mould is needed. Specifically, just at least one rounded protrusion is formed on the existing mould to form the at least one rounded recess. This enables inexpensive production of lightguides with improved homogeneity, that is without a dark spot.

Preferably, the at least one rounded recess has a spherical shape. Thanks to this shape, the at least one rounded recess reflects light more isotropically and a dark spot in the proximal output section is illuminated more homogeneously. This improves the resulting visual appearance.

Preferably, the at least one rounded recess comprises a first rounded recess and a second rounded recess, wherein the second rounded recess extends into the first rounded recess. The second rounded recess is preferably used when the first rounded recess does not eliminate whole dark spot in the proximal output section, specifically when a dark spot remains near the first end of the output surface. As a result of the second rounded recess extending into the first rounded recess, the proximal output section is illuminated more homogeneously and no dark spot remains in the proximal output section.

Preferably, the first rounded recess is arranged at least partially on the first reflection element and the second rounded recess is arranged at least partially on the second reflection element. The first rounded recess and the second rounded recess in these positions reflect light near the first end of the output surface, where the dark spot typically occurs. The second rounded recess reflects the light from the light source closer to the first end of the output surface than the first rounded recess does.

Preferably, the second rounded recess is smaller than the first rounded recess, because the second rounded recess should not reduce the light flux too much. The light outputting through the output surface is thus more homogenous and it still has sufficient intensity.

The shortcomings of the solutions known in the prior art are to some extent also eliminated by a vehicle lamp comprising a light source and the lightguide according to the present invention, wherein the light source is directed to the coupling face of the first part of the lightguide. Light from the light source is coupled into the lightguide, then passes through the first part of the lightguide to the second part of the lightguide and is reflected on the reflection surface and passes through the output surface. Light source can be, for example, LED.

The vehicle lamp can be a side marker lamp, which can be used on the side of the vehicle to mark the contour of the vehicle. This lamp is often seen from a side viewing angle and it is therefore very advantageous to eliminate a dark spot using the at least one rounded recess on the reflection surface of the lightguide.

The shortcomings of the solutions known in the prior art are to some extent also eliminated by a mould for moulding the lightguide according to the present invention, the mould comprising an elongated first mould part for moulding the elongated first part of the lightguide and a second mould part for moulding the second part of the lightguide, wherein the first mould part comprises a coupling face mould part for moulding the coupling face of the lightguide for coupling light from a light source into the lightguide. The second mould part comprises a reflection surface mould part for moulding the reflection surface of the lightguide and an output surface mould part for moulding the output surface of the lightguide for outputting light from the lightguide. The reflection surface mould part comprises a plurality of reflection element mould parts for moulding a plurality of reflection elements of the lightguide for reflecting light towards the output surface. The plurality of reflection element mould parts comprises at least a first reflection element mould part for moulding the first reflection element of the lightguide and a second reflection element mould part for moulding the second reflection element of the lightguide, wherein the first reflection element mould part is the closest to the first mould part from the plurality of reflection element mould parts and the second reflection element mould part is the closest to the first reflection element mould part from the plurality of reflection element mould parts.

The output surface mould part comprises a proximal output section mould part for moulding the proximal output section of the lightguide which is proximal to the first mould part and a distal output section mould part for moulding the distal output section of the lightguide which is distal to the second mould part. The mould according to present invention comprises at least one rounded protrusion for moulding the at least one rounded recess of the lightguide for reflecting light towards the proximal output section of the lightguide to increase homogeneity of light emitted from the output surface of the lightguide. The at least one rounded protrusion is arranged at least partially on the first reflection element mould part.

The mould has a negative shape with respect to the shape of the lightguide and that means that respective mould parts have negative shape with respect to the shape of the respective parts of the lightguide. For example, the first mould part has a negative shape with respect to the shape of the first part of the lightguide and, for example, the at least one rounded protrusion has a negative shape with respect to the shape of the at least one rounded recess. The at least one rounded protrusion for moulding the at least one rounded recess can be formed on the first reflection element by welding. This is not a significant modification of the existing mould and production costs are not rapidly increased.

The shortcomings of the solutions known in the prior art are to some extent also eliminated by a method of manufacturing the mould according to the present invention comprising the steps of providing a mould and forming at least one rounded protrusion on the mould.

The mould, which is provided in the first step of the method, is known from the state of the art, and comprises an elongated first mould part for moulding the elongated first part of the lightguide and a second mould part for moulding the second part of the lightguide, wherein the first mould part comprises a coupling face mould part for moulding the coupling face of the lightguide for coupling light from a light source into the lightguide and wherein the second mould part comprises a reflection surface mould part for moulding the reflection surface of the lightguide and an output surface mould part for moulding the output surface of the lightguide for outputting light from the lightguide. The reflection surface mould part comprises a plurality of reflection element mould parts for moulding a plurality of reflection elements of the lightguide for reflecting light towards the output surface of the lightguide, wherein the plurality of reflection element mould parts comprises at least a first reflection element mould part for moulding the first reflection element of the lightguide and a second reflection element mould part for moulding the second reflection element of the lightguide. The first reflection element mould part is the closest to the first mould part from the plurality of reflection element mould parts and the second reflection element mould part is the closest to the first reflection element mould part from the plurality of reflection element mould parts. The output surface mould part comprises a proximal output section mould part for moulding the proximal output section of the lightguide which is proximal to the first mould part and a distal output section mould part for moulding the distal output section of the lightguide which is distal to the second mould part.

Second step is the step of forming at least one rounded protrusion on the mould for moulding the at least one rounded recess of the lightguide for reflecting light towards the proximal output section of the lightguide to increase homogeneity of light emitted from the output surface of the lightguide, wherein the at least one rounded protrusion is formed at least partially on the first reflection element mould part. The existing mould can thus be used and is only slightly modified by forming the at least one rounded protrusion. Specifically, the at least one rounded protrusion can be formed on the first reflection element by welding.

BRIEF DESCRIPTION OF THE DRAWINGS

A summary of the invention is further described by means of exemplary embodiments thereof, which are described with reference to the accompanying drawings, in which.

DETAILED DESCRIPTION OF THE CURRENT EMBODIMENTS

The invention will be further described by means of exemplary embodiments with reference to the respective drawings.

Figure 1:
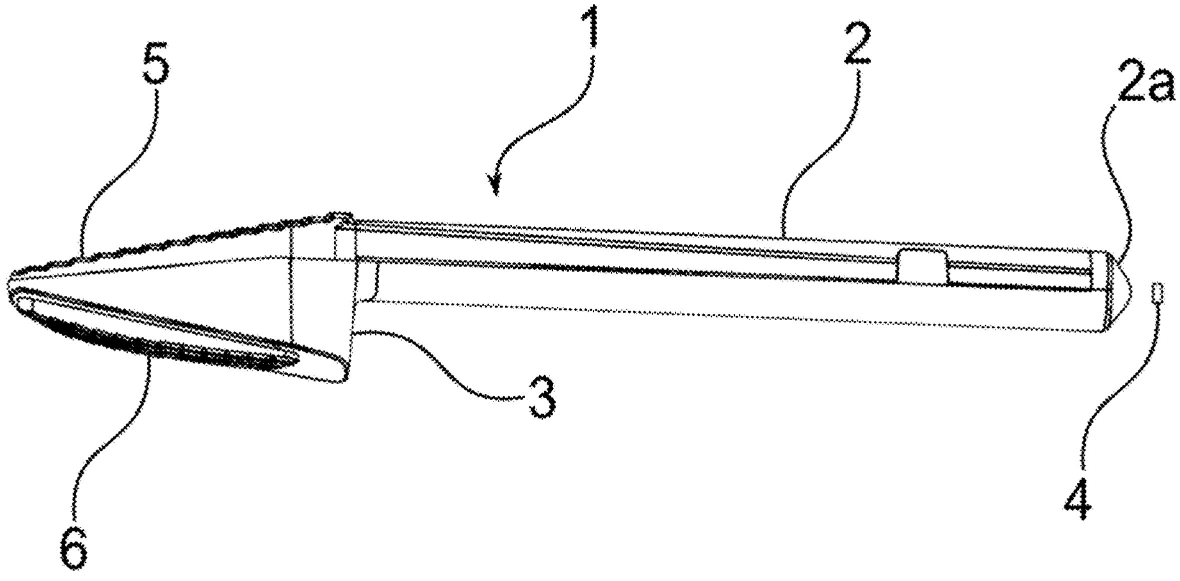
FIG. 1 shows a lightguide according to the invention in an exemplary embodiment with a light source.
Figure 2:
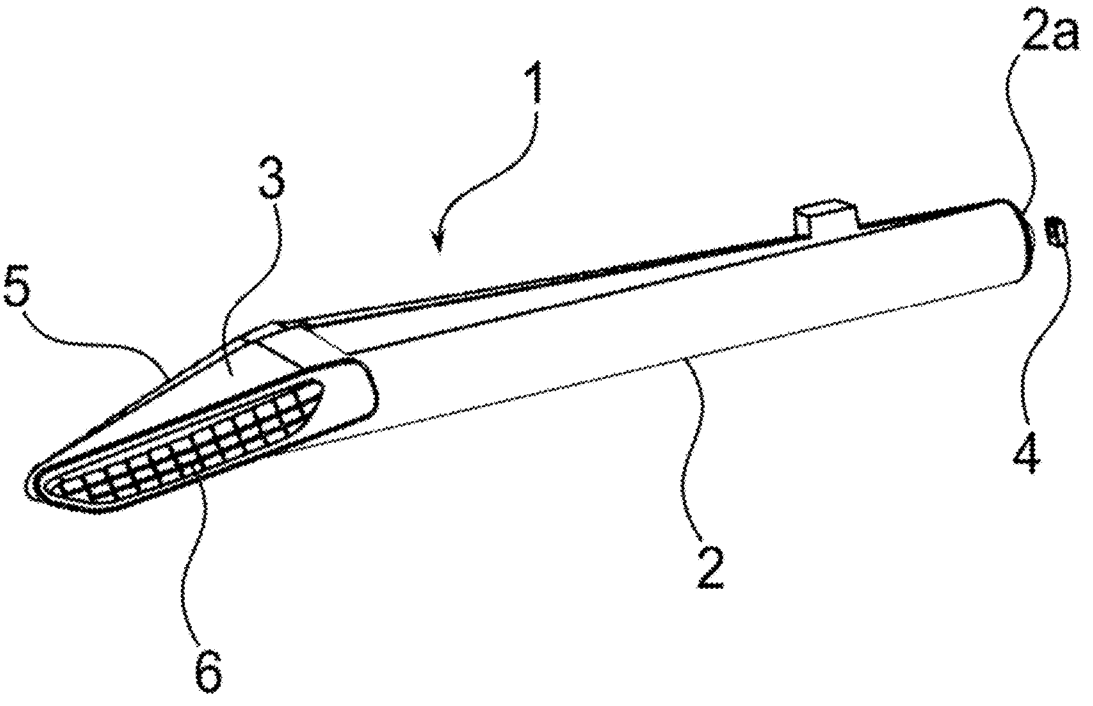
FIG. 2 shows another view of the lightguide according to the invention in the exemplary embodiment with an output surface visible.
Figure 3:
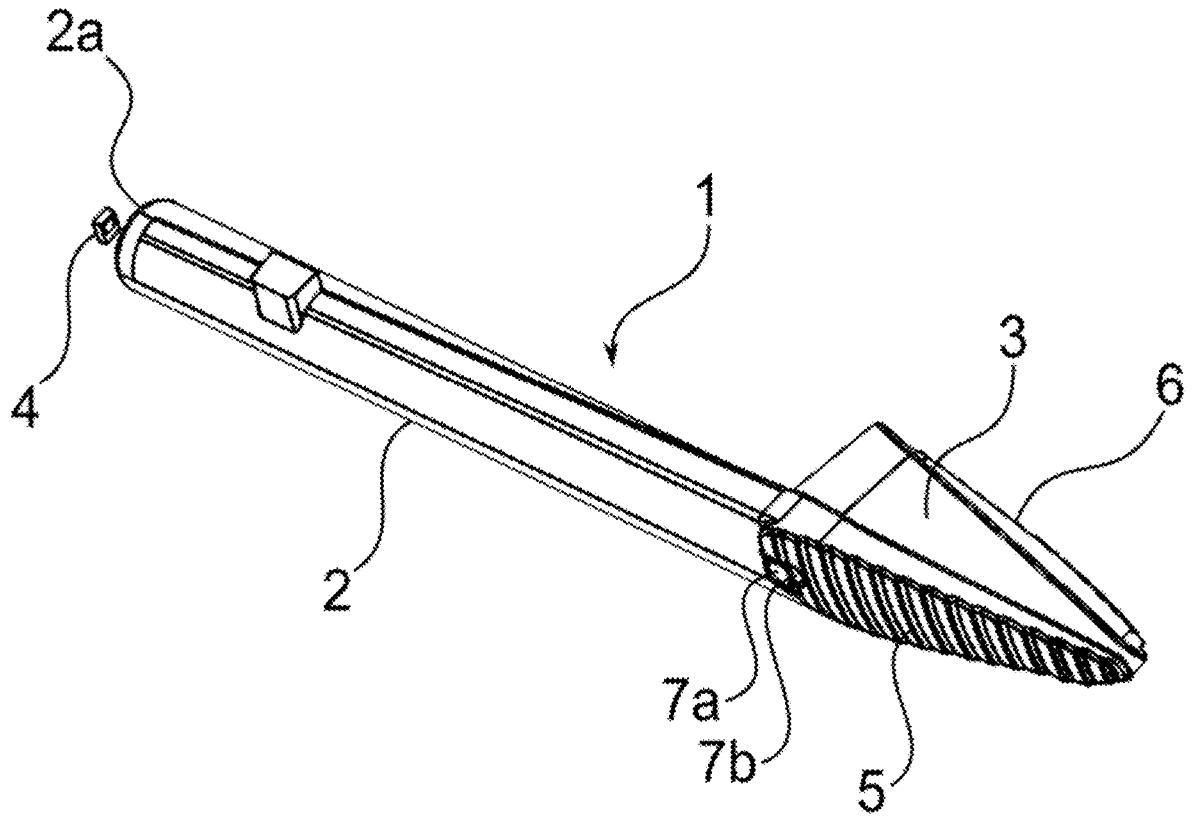
FIG. 3 shows yet another view of the lightguide according to the invention in the exemplary embodiment with a reflection surface visible.

An example of the invention is a lightguide 1 as depicted in FIG. 1 to FIG. 5, specifically it is a lightguide 1 for a side marker lamp. The lightguide 1 according to the present invention comprises an elongated, approximately cylindrical first part 2 and a second part 3, wherein the second part 3 forms a continuation of the first part 2 on one end of the first part 2. The first part 2 has two ends, wherein the first end comprises a coupling face 2*a* for coupling light from a light source 4 into the first part 2 of the lightguide 1 and the second end connects the first part 2 to the second part 3. As can be seen in FIG. 1 to FIG. 3, the light source 4, for example LED, is arranged outside the lightguide 1 near the coupling face 2*a* and is directed to the coupling face 2*a*. Preferably, the coupling face 2*a* has a conical shape. The light from the light source 4 is thus coupled into the lightguide 1 through the coupling face 2*a* and then passes through the first part 2 to the second part 3. The lightguide 1 is made of plastic.

The second part 3 comprises a reflection surface 5 and an output surface 6 which are arranged substantially opposite to each other and which are arranged on opposite lateral sides of the lightguide 1. In this exemplary embodiment, as can be seen for example in FIG. 1, the second part 3 is approximately wedge-shaped. That means that although the reflection surface 5 and the output surface 6 are arranged opposite to each other, they are not parallel. Specifically, the width of the second part 3 is decreasing from the one end, which is adjacent to the first part 2, to another end.

The reflection surface 5 comprises a plurality of reflection elements 5*a*, 5*b* for reflecting light towards the output surface 6. Reflection occurs due to the principle of total internal reflection, which means that the incident angle of a light beam is larger than critical angle and all the light is reflected. In the exemplary embodiment according to FIG. 1 to FIG. 5, the reflection elements 5*a*, 5*b* are implemented as step-shaped linear, approximately rectangular, elements. Specifically, the reflection surface 5 comprises fifteen reflection elements 5*a*, 5*b*, however the number of reflection elements 5*a*, 5*b* can be different, for example less than fifteen reflection elements 5*a*, 5*b* can be provided. Alternatively, the shape or dimension of the reflection elements 5*a*, 5*b* can be different as well, if such an arrangement allows light to be reflected towards the output surface.

Figure 4:
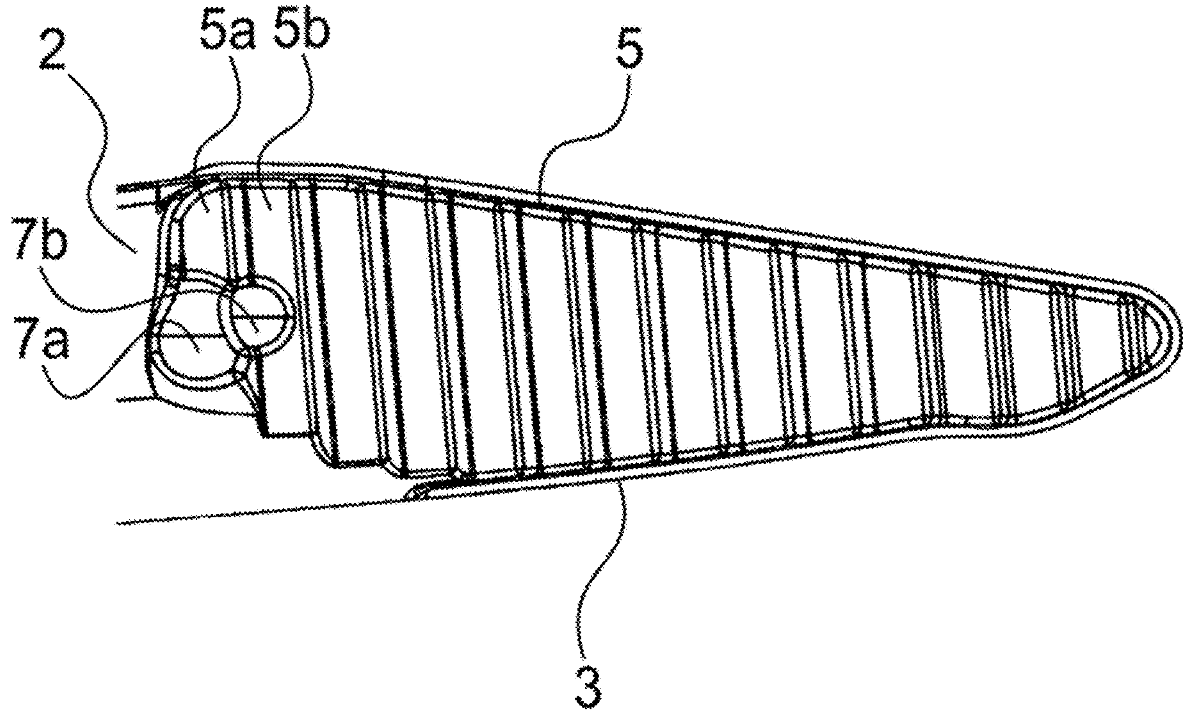
FIG. 4 shows a detail view of the reflection surface with a plurality of reflection elements and with two rounded recesses.
Figure 5:
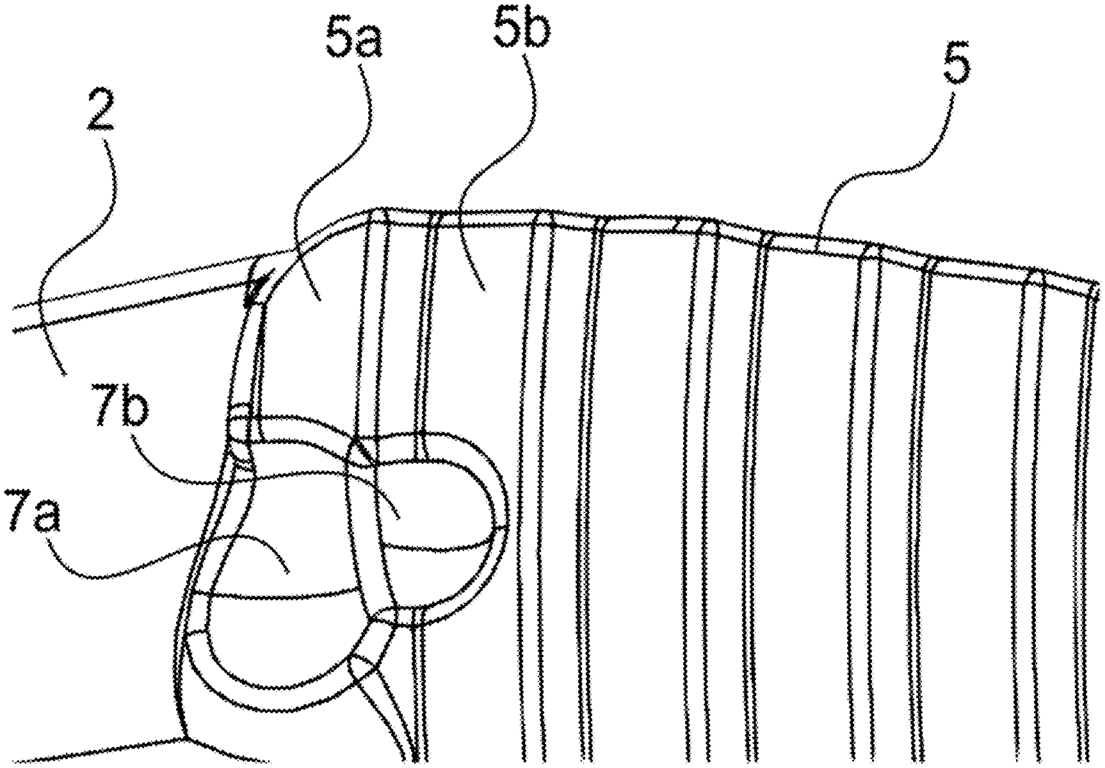
FIG. 5 shows a detail view of the two rounded recesses arranged on a first reflection element and a second reflection element.

The plurality of reflection elements 5*a*, 5*b* comprises at least a first reflection element 5*a* and a second reflection element 5*b*, which can be seen in detail in FIG. 4 or FIG. 5. The first reflection element 5*a* is the closest to the first part 2 from the plurality of reflection elements 5*a*, 5*b* and the second reflection element 5*b* is the closest to the first reflection element 5*a* from the plurality of reflection elements 5*a*, 5*b*. In other words, the first reflection element 5*a* is arranged adjacent to the first part 2 and the second reflection element 5*b* is arranged adjacent to the first reflection element 5*b*.

The output surface 6 comprises a plurality of output elements for outputting light from the lightguide 1, wherein in the exemplary embodiment of the invention, these elements are step-shaped. In this exemplary embodiment, as can be seen for example in FIG. 1 or FIG. 2, the output surface 6 comprises thirteen output elements, however the number, shape or dimensions of the output elements can be varied. For the purpose of this invention, a proximal output section of the output surface 6 and a distal output section of the output surface 6 are defined. The proximal output section is proximal to the first part 2 and a distal output section is distal to the first part 2. The proximal output section is thus located adjacent to a first end of the output surface 6 and the distal output section is located adjacent to the proximal output section and it extends from the proximal output section to a second end of the output surface 6, wherein the first end of the output surface 6 is closer to the first part 2 of the lightguide 1 than the second end of the output surface 6.

In the exemplary embodiment of the present invention, the area of the proximal output section is approximately one fifth of the area of the entire output surface 6. The area of the distal output section is complementary, which means that the proximal output section and the distal output section together form the entire output surface 6. In alternative embodiments of the lightguide 1, the area of the proximal output section can be smaller than one fifth of the entire output surface 6, for example approximately one sixth, one seventh or smaller. On the other hand, the area of the proximal output section can be larger than one fifth of the entire output surface 6, for example approximately one fourth, one third or larger. However, the area of the proximal output section is generally smaller than or equal to the area of the distal output section.

The above-described arrangement of the lightguide 1 is known from the prior art as well, with the essential difference that the lightguide 1 of the present invention comprises at least one rounded recess 7*a*, 7*b* on the reflection surface 5 as will be described below.

As can be seen in FIG. 3, FIG. 4 or FIG. 5, the lightguide 1 according to the present invention comprises a first rounded recess 7*a* and a second rounded recess 7*b*, wherein the first rounded recess 7*a* is arranged at least partially on the first reflection element 5*a* and the second rounded recess 7*b* is arranged at least partially on the second reflection element 5*b*. The second rounded recess 7*b* extends into the first rounded recess 7*a* and is smaller than the first rounded recess 7*b*, which means that the surface area of the second rounded recess 7*b* is smaller than the surface area of the first rounded recess 7*a*. Specific sizes of the first rounded recess 7*a* and the second rounded recess 7*b* are chosen so that the light flux though the second part 3 is not reduced too much and the light outputting through the output surface 6 still has sufficient intensity. Preferably, the first rounded recess 7*a* and the second rounded recess 7*b* have a spherical shape. The diameter of the first rounded recess 7*a* is thus larger than the diameter of the second rounded recess 7*b*.

The first rounded recess 7*a* and the second rounded recess 7*b* reflect the light towards the proximal output section to eliminate a dark spot on an output surface 6. Specifically, the first rounded recess *7a* reflects the light closer to the distal output section than the second rounded recess *7b* does. On the other hand, the second rounded recess 7*b* reflects the light closer to the first end of the output surface 6 than the first rounded recess 7*a* does.

Alternatively, the lightguide 1 may comprise only the first rounded recess 7*a*, if the dark spot in the proximal output section is reliably and sufficiently eliminated.

Alternatively, more than two rounded recesses 7*a*, 7*b* may be formed on the reflection surface 5, if the dark spot is not sufficiently eliminated by the first rounded recess 7*a* and the second rounded recess 7*b*. A third rounded recess has to be smaller than the second rounded recess 7*b*. However, considering the lightguide 1 in the exemplary embodiment described above, practical tests show that more than two rounded recesses 7*a*, 7*b* are not necessary.

Alternatively, the at least one rounded recess 7*a*, 7*b* do not necessarily need to be spherical, however it should be rounded so that the proximal output section is illuminated homogeneously.

The lightguide 1 can be moulded from plastic using the existing mould which is only slightly modified. Specifically, the at least one rounded protrusion for moulding at least one rounded recess 7*a*, 7*b* is formed on the existing mould for example by welding. The modified mould according to the invention thus comprises respective mould parts for moulding the respective parts of the lightguide 1.

Specifically, the mould for moulding the lightguide 1 comprises an elongated first mould part for moulding the elongated first part 2 and a second mould part for moulding the second part 3, wherein the first mould part comprises a coupling face mould part for moulding the coupling face 2*a* for coupling light from a light source 4 into the lightguide 1. The second mould part comprises a reflection surface mould part for moulding the reflection surface 5 and an output surface mould part for moulding the output surface 6 for outputting light from the lightguide. The reflection surface mould part comprises a plurality of reflection element mould parts for moulding a plurality of reflection elements 5*a*, 5*b* for reflecting light towards the output surface 6. The plurality of reflection element mould parts comprises at least a first reflection element mould part for moulding the first reflection element 5*a* and a second reflection element mould part for moulding the second reflection element 5*b*, wherein the first reflection element mould part is the closest to the first mould part from the plurality of reflection element mould parts and the second reflection element mould part is the closest to the first reflection element mould part from the plurality of reflection element mould parts.

The output surface mould part comprises a proximal output section mould part for moulding the proximal output section which is proximal to the first mould part and a distal output section mould part for moulding the distal output section which is distal to the second mould part. The mould comprises at least one rounded protrusion for moulding the at least one rounded recess 7*a*, 7*b* for reflecting light towards the proximal output section, wherein the at least one rounded protrusion is arranged on the first reflection element mould part. In an exemplary embodiment, a first rounded protrusion and a second rounded protrusion are formed on the reflection surface mould part. Specifically, the first rounded protrusion is formed at least partially on the first reflection element mould part and the second rounded protrusion is formed at least partially on the second reflection element mould part. The second rounded protrusion extends into the first rounded protrusion (that means that it is formed in contact with the first rounded protrusion) and is smaller than the first rounded protrusion. Specific sizes of the first rounded protrusion and the second rounded protrusion are chosen so that the light flux through the second part 3 of the moulded lightguide 1 is not reduced too much and the light outputting through the output surface 6 still has sufficient intensity.

Alternatively, the mould may comprise only the first rounded protrusion, if the dark spot in the proximal output section is reliably and sufficiently eliminated.

Alternatively, more than two rounded protrusions may be formed on the reflection surface mould part, if the dark spot is not sufficiently eliminated by the first rounded protrusion and the second rounded protrusion. A third rounded protrusion has to be smaller than the second rounded protrusion. However, considering the lightguide 1 and the mould in the exemplary embodiment described above, practical tests show that more than two rounded protrusions are not necessary.

Alternatively, the at least one rounded protrusion do not necessarily need to be spherical, however it should be rounded so that the proximal output section of the moulded lightguide 1 is illuminated homogeneously.

LIST OF REFERENCE NUMERALS

1 lightguide
2 first part
2*a* coupling face
3 second part
4 light source
5 reflection surface
5*a* first reflection element
5*b* second reflection element
6 output surface
7*a* first rounded recess
7*b* second rounded recess The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A lightguide for a vehicle lamp, the lightguide comprising:

an elongated first part and a second part, wherein the first part comprises a coupling face for coupling light from a light source into the lightguide and wherein the second part comprises a reflection surface and an output surface for outputting light from the lightguide, wherein the reflection surface comprises a plurality of reflection elements for reflecting light towards the output surface, wherein the plurality of reflection elements comprises at least a first reflection element and a second reflection element, wherein the first reflection element is the closest to the first part from the plurality of reflection elements and the second reflection element is the closest to the first reflection element from the plurality of reflection elements, wherein the output surface comprises a proximal output section which is proximal to the first part and a distal output section which is distal to the first part, wherein the lightguide comprises at least one rounded recess for reflecting light towards the proximal output section to increase homogeneity of light emitted from the output surface, wherein the at least one rounded recess is arranged at least partially on the first reflection element, and wherein the at least one rounded recess comprises a first rounded recess and a second rounded recess, wherein the second rounded recess extends into the first rounded recess.

2. The lightguide according to claim 1, wherein the at least one rounded recess has a spherical shape.

3. The lightguide according to claim 1, wherein the first rounded recess is arranged at least partially on the first reflection element and the second rounded recess is arranged at least partially on the second reflection element.

4. The lightguide according to claim 1, wherein the second rounded recess is smaller than the first rounded recess.

5. A vehicle lamp comprising:

a light source; and the lightguide according to claim 1, wherein the light source is directed to the coupling face of the first part of the lightguide.

6. A side marker lamp comprising the vehicle lamp according to claim 5.

* * * * *